United States Patent [19]

Nishimura et al.

[11] Patent Number: 4,721,345

[45] Date of Patent: Jan. 26, 1988

[54] ACTUATOR OF ANTI-SKID DEVICE FOR MOTOR VEHICLES

[75] Inventors: Takumi Nishimura, Chiryu; Tadao Saito, Nagoya; Nobuyasu Nakanishi; Noboru Noguchi, both of Toyota, all of Japan

[73] Assignees: Aisin Seiki Kabushiki Kaisha, Kariya; Toyota Jidosha Kabushiki Kaisha, Toyota, both of Japan

[21] Appl. No.: 881,696

[22] Filed: Jul. 3, 1986

[30] Foreign Application Priority Data

Jul. 3, 1985 [JP] Japan .................. 60-102344[U]

[51] Int. Cl.$^4$ ............................ B60T 8/42; B60T 8/34
[52] U.S. Cl. ...................................... 303/113; 303/115
[58] Field of Search .................... 303/10, 11, 92, 91, 303/113, 115, 116, 117, 119

[56] References Cited

U.S. PATENT DOCUMENTS 4,605,263 8/1986 Ando et al. ................... 303/119

Primary Examiner—Andres Kashnikow
Assistant Examiner—Timothy Newholm
Attorney, Agent, or Firm—Oblon, Fisher, Spivak, McClelland, & Maier

[57] ABSTRACT

An anti-skid device for motor vehicles provided with a hydraulic circuit for connecting the brake master cylinder with the wheelbrake cylinder has a first valve for dividing the hydraulic circuit into two sections, a second valve for supplying the hydraulic pressure to the pressure reducing piston and a third valve having two valve sections for controlling the hydraulic pressure supplied to a working fluid chamber so as to prevent it from exceeding a predetermined degree. The third valve is constructed so that a fluid chamber defined by both the slidable valve members and fixed valve members of the two valve sections is formed therein so as to be communicated with the working fluid chamber side circuit through an orifice, in order to prevent the generation of strange sounds from the third valve during its operation by damper action of the fluid chamber.

4 Claims, 4 Drawing Figures

ACTUATOR OF ANTI-SKID DEVICE FOR MOTOR VEHICLES

BACKGROUND OF THE INVENTION

1. Field of the Invention

This invention relates to an anti-skid device for motor vehicles, particularly to an anti-skid device for motor vehicles which comprises a first valve disposed in a hydraulic circuit and selectively dividing the hydraulic circuit connecting a brake master cylinder with a wheelbrake cylinder into a master cylinder side circuit and a wheelbrake side circuit; an electric motor; a pump driven by the motor; an accumulator for reserving working fluid pressure generated by the pump; a pressure reducing piston for opening and closing the first valve by a forward movement from its inactive position caused by hydraulic pressure of the wheelbrake cylinder side circuit and a backward movement to its inactive position caused by the working fluid pressure and thereby increasing or decreasing the capacity of the wheelbrake cylinder side circuit; and a second valve for supplying the working fluid pressure to the pressure reducing piston when the wheel is rotating in a normal condition in order to move the piston to its inactive position against the hydraulic pressure of the wheelbrake cylinder and for releasing the working fluid pressure from the pressure reducing piston when the wheel is about to be locked in order to move the piston forward by means of the hydraulic pressure of the wheelbrake cylinder side circuit.

2. Prior Art

In a conventional anti-skid device of the aforementioned type, for example, such device as disclosed in the specification of U.S. Pat. No. 3,722,960, a high working fluid pressure in an accumulator is directly supplied to a pressure reducing piston when a wheel is rotating in a normal condition and the working fluid pressure is released from the pressure reducing piston only when the wheel is about to be locked.

However, during vehicle operation, the time when the brake is operated is very short as compared to the time when the brake is not operated, namely, almost all times during vehicle running are occupied by the latter non-braking time. Consequently, sealing members which are disposed in a hydraulic circuit conducting the hydraulic pressure from the accumulator to the pressure reducing piston, for example, the sealing member equipped to the pressure reducing piston, are subjected to heavy load. This makes it necessary to replace sealing members frequently owing to their shortened lives and causes a troublesome maintainance of the device.

In order to solve the above problem, the inventors have previously proposed a new device which has a third valve for controlling the working fluid pressure supplied to the working fluid chamber so as to make it to be a value corresponding to the hydraulic pressure in the brake master cylinder side hydraulic circuit and not to supply an unnecessary high working fluid pressure to the working fluid chamber, said third valve comprising; the one side valve section for controlling the communication and interruption between the accumulator and the working fluid chamber supplying the working fluid pressure to the pressure reducing piston; the other side valve section for controlling the communication and interruption between the working fluid chamber and the drain circuit; and a piston for closing the other side valve section and opening the one side valve section against the hydraulic pressure of the working fluid circuit being actuated by the hydraulic pressure of the brake master cylinder side circuit.

The inventors have embodied the above third valve system and tested it. In this embodiment, the valve body of the other side valve section was disposed in the internal opening so as not to substantially interrupt the flow of the working fluid. But in this embodiment, a strange sound was generated from the third valve. By further study, it has been found that the one side valve section was opened abruptly and excessively when the piston opens the one side valve section and closes the other side valve portion, as the valve body of the other side valve section can move without any resistance. This has caused opening of the one side valve portion and closing of the other side valve section, as the hydraulic pressure introduced from the accumulator to the working fluid chamber side circuit became too large. The repetitions of such opening and closing action of the one side valve section and the other side valve section with high frequency was thought to cause generation of the strange sound.

SUMMARY OF THE INVENTION

The object of the present invention is to provide an actuator of anti-skid device having the third valve, which does not generate stange sounds at the time of operation of the third valve.

Another object of the present invention is to provide an actuator of anti-skid device having the third valve, in which the excessive opening of the one side valve section is prevented at the time of operation of the third valve.

In accordance with the present invention, the valve body of the other side valve section of the third valve is fitted into the internal opening of a seat member of the one side valve section slidably and fluid-tightly, thereby forming a fluid chamber surrounded by the seat member and the valve body of the one side valve section and the valve body of the other side valve section, said fluid chamber being communicated with the working fluid chamber side circuit by means of an orifice formed on the valve body of the other side valve section.

The fluid chamber defined by the seat member and the valve body of the one side valve section as well as the valve body of the other side valve section acts like a damper member together with the orifice formed on the valve body for the movement of the valve body of the other side valve section. Consequently, when the one side valve section is opened and the other side valve section is closed, an abrupt and excessive opening of one side valve portion is prevented and the generation of strange sound is avoided. The fluid-tightness between the valve body of the other side valve portion and the internal opening of the seat member of one side valve section makes it possible to get an increased damper effect brought by friction force of the valve body of the side valve section, when a seat member made of rubber is used.

As stated above, the generation of strange sound from the third valve can be prevented by the present invention. As a fluid chamber defined by the valve body and the seat member of the one side valve section and the valve body of the other side valve section is communicated with the working fluid pressure circuit by means of an orifice formed on the valve body of the other side valve unit, it becomes easy to form accurately the size of the passageway as compared with the case where the passageway corresponding to the orifice is formed between the outer surface of the valve body of the other side valve section and the inner surface of the seat member of the one side valve portion.

Further, as the friction between the valve body of the other side valve section and the seat member of the one side valve section is utilized as a damper action too, the prevention of the generation of strange sound can be achieved most effectively.

Other and further objects, features and advantages of the present invention will be understood more clearly and fully from the following detailed description of preferred embodiments with reference to the attached drawings.

DETAILED DESCRIPTION OF A PREFERRED EMBODIMENT

Figure 1A:
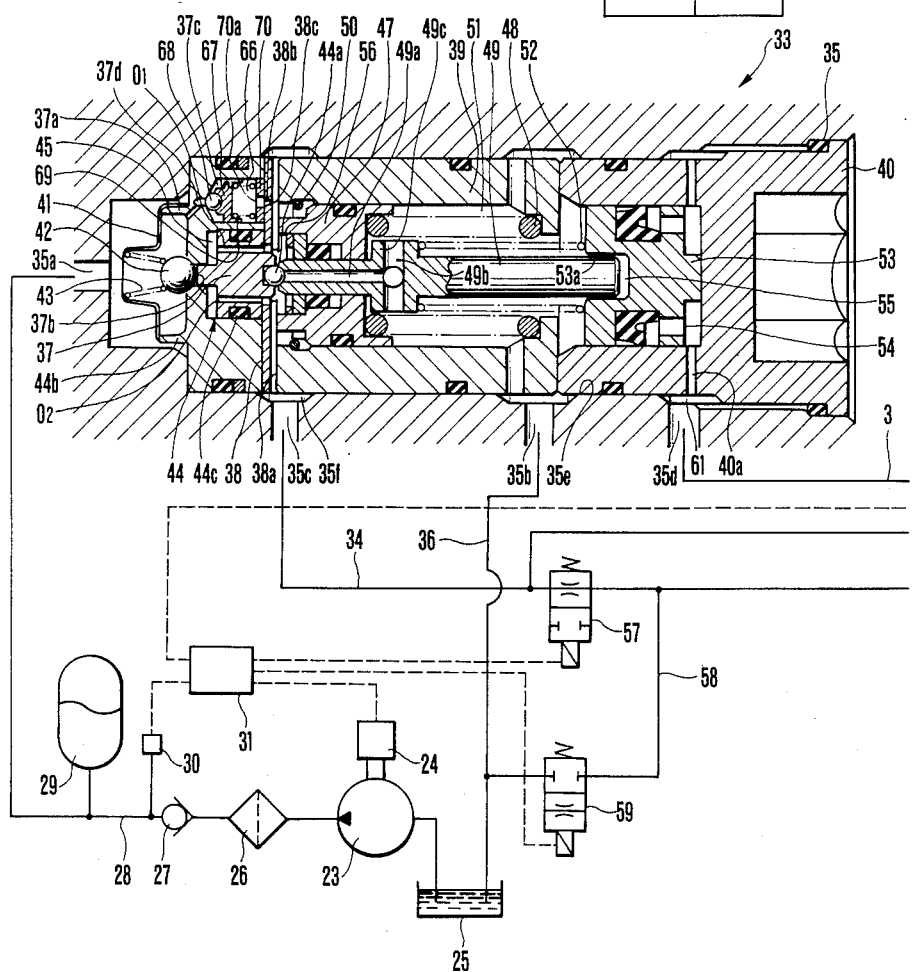
FIG. 1 shows schematically by way of FIGS. 1a and 1b the one embodiment of the present invention with the sectional view of the valve mechanism and the flowline of hydraulic circuits.
Figure 1:
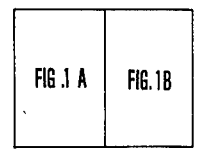
Figure 1B:
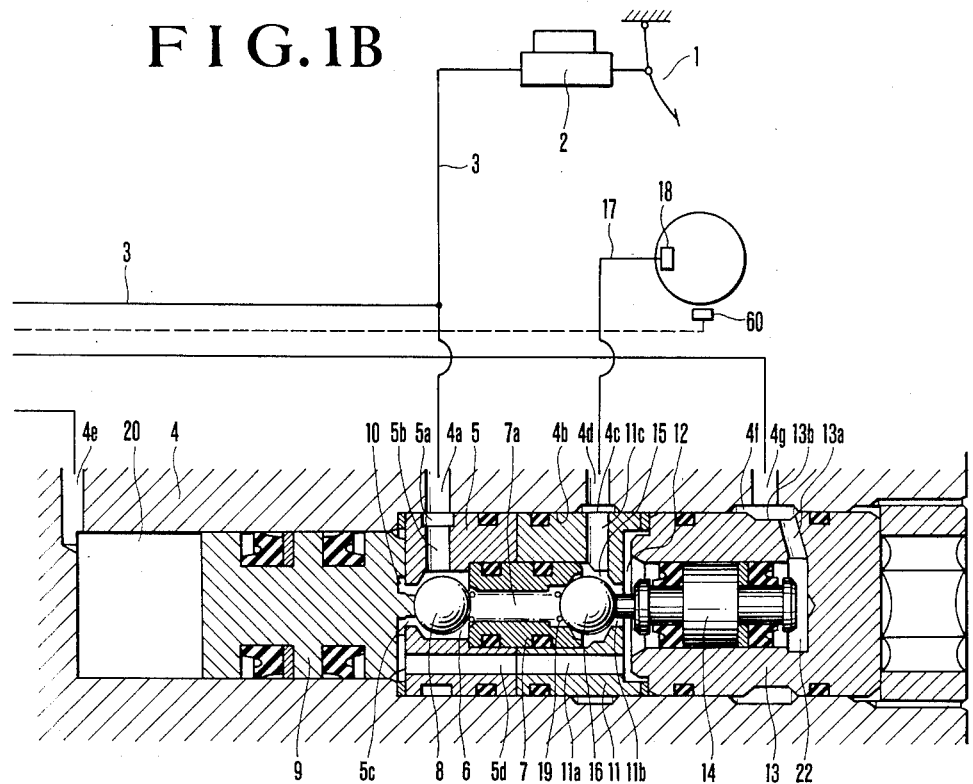

Referring to FIG. 1, the brake master cylinder 2 is coupled operationally with the brake pedal 1 and generates fluid pressure by stepping the brake pedal 1, according to the stepping force. The fluid pressure is applied to the valve chamber 6 in the valve seat 5 by way of the circuit 3, the hole 4a in the body 4, and the annular groove 5a and hole 5b of the valve seat fitted fluid-tightly into the cylinder hole 4b in the body 4. This valve chamber 6 is defined by the valve seat 7 fitted fluid-tightly into the valve seat 5 and, when the valve 8 installed in the valve chamber 6 keeps the hole 5c in the valve seat 5 open as shown in the drawing, the fluid pressure applied to the valve chamber 6 is further applied to the chamber 12 on the right side, by way of the hole 5c, the decompression chamber 10 defined on the left side of the valve seat 5 by a pressure reducing piston 9 fitted fluid-tightly and slidably into the cylinder hole 4b, the hole 5d in the valve seat 5, and the hole 11a in the valve seat 11 fitted into the cylinder hole 4b fluid-tightly. This chamber 12 is defined by the closing member 13 fitted fluid-tightly into the cylinder hole 4b, the piston 14 fitted fluid-tightly and slidably into the closing member 13, and the valve seat 11. When the valve 16 installed in the valve chamber in the valve seat 11 closes the hole 7a in the valve seat 7 and opens the hole 11b in the valve seat 11a as shown in the drawing, the fluid pressure applied to the chamber 12 is further applied to the wheel brake cylinder 18 by way of the hole 11b, the valve chamber 15, the hole 11c in the valve seat 11, the annular groove 4c and hole 4d of the body 4, and the circuit 17.

Valves 8 and 16 are biased in a direction away from each other by the spring 19 equipped between the two valves. In the drawing, the pressure reducing piston 9 takes its inactive position and lifts the valve 8 off the valve seat 5 against the spring 19 to open the hole 5c. Also in the drawing, the piston 14 takes its inactive position and lifts the valve 16 off the valve seat 11 against the spring 19 to open hole 11b but also brings it into contact with the valve seat 7 to close the hole 7a. As will be understood from the explanation in the followings, the valve seat 5 and valve 8 constitute the aforementioned first valve.

Pump 23 for generating working fluid pressure is driven by an electric motor 24 and draws fluid from a reservoir 25 and discharges it to a circuit 28 by way of a strainer 26 and check valve 27. To this circuit 28 are connected a gas spring type accumulator 29 and a pressure-sensitive switch 30. This pressure-sensitive switch 30 and motor 24 are connected to an electronic control unit 31 which operates the motor 24 by a signal from the pressure-sensitive switch 30 in such a manner that the working fluid pressure in the accumulator 29 is present within the specified range (175 to 200 kg/cm$^2$) required for the operation of the device. The working fluid pressure in the accumulator 29 is supplied to the circuit 34 by a circuit 28 by way of a regulator valve 33. This circuit 34 is for introducing the working fluid pressure to the working fluid pressure chamber 20 on the left side of the pressure reducing piston 9.

The regulator valve 33 is the third valve mentioned above and has a body 35 which is provided with a hole 35a communicating with the circuit 28, a hole 35b communicating with the reservoir 25 by way of the drain circuit 36, a hole 35c communicating with the circuit 34, and a hole 35d communicating with the circuit 3. In the cylinder hole 35e in this body 35 are fitted and fixed a valve seat 37, washer 38, piston guide 39, and closing member 40 in sequence, of which the valve seat 37, piston guide 39, closing member 40 and cylinder hole 35e are impervious to fluid. On the left side of the valve seat 37 is provided an annular projection 37a, to which a filter/spring retainer 41 provided with numerous small holes is fitted and fixed, and in this filter/spring retainer 41 are provided a valve 42 which opens and closes the hole 37b in the valve seat 37 and a spring 43 which brings this into contact with the valve seat 37 so as to close the hole 37b. These valve seat 37, valve 42 and spring 43 constitute the one side valve section, of which the valve seat 37 is a seat member and the valve 42 is a valve body. A ball 44a is press-fitted into the right end section of the large-diameter portion which is the right section of the hole 37a in the valve seat 37, and a valve body 44 comprising a movable member 44b on which outer periphery a rubber seal member 44c is provided and a spring 46 that biases the valve body to the washer 38 side. The outside diameter of the right end section of this movable member 44b is smaller than the inside diameter of the washer 38. These valve body 44 and spring 46 constitute the other side valve section in conjunction with the rod 49 as the seat member to be mentioned later. The movable member 44b is fitted into the hole 37b in the valve seat 37 fluid-tightly and slidably and the fluid chamber 45 enclosed by the valve seat 37, valve 42 and movable member 44b is formed, and this fluid chamber 45 communicates with the inner hole in the washer through the orifices 01 and 02 formed in the movable member 44b.

Into the piston guide 39, a piston 47 is fitted fluid-tightly and slidably, as are a spring 48 that biases this piston 47 to the washer 38 side and a rod 49 whose right end portion passes through the piston 47 fluid-tightly and slidably. Stopper ring 50 of the piston 47 is provided on the inner periphery of the left end portion of the piston guide. In the rod 49 are formed a hole 49a which is opened and closed by the valve 44a and a hole 49b which communicates with the drain chamber 51 communicating this hole 49a with the hole 35b, and the rod 49 is biased by the spring 52 so that the hole 49 is closed by the valve 44a. And the left end portion of the rod 49 is slidably fitted into the hole 53a in the piston 53 which is fitted into the closing member 40 fluid-tightly and slidably. The chamber 54 defined in the closing member 40 by the piston 53 communicates with the hole 40a in the closing member 40 and the hole 35d by way of the annular passage 61, thereby the fluid pressure generated by the brake master cylinder 2 being applied to this chamber 54. Because of the fluid pressure of the chamber 54 the piston 53 slides to the rod 49 side against the spring 52 and decreases the clearance 55 between the bottom surface of the hole 53a and the right end surface of the rod 49 to extinction to push the rod 49 leftward, moves the valve 44a and movable member 44b integrally with the rod 49 against the spring 46 after closing the hole 49 by the valve 44a, lifts the valve 42 off the valve seat 37 against the fluid pressure from the spring 43 and accumulator 29, and opens the hole 37a to introduce the working fluid pressure from the accumulator 29 to the chamber 56 (circuit section on the working fluid pressure chamber side) by way of the fluid chamber 45 and orifices 01 and 02. The working fluid pressure of this chamber 56 acts so as to push the rod 49 and piston 47 rightward. Here, if the pushing force which acts upon the rod 49 exceeds the pushing force by the piston 53 and spring 52 before the pushing force which acts upon the piston 47 exceeds the pushing force of the spring 48 in the working fluid pressure increasing process of the chamber 56 because of the low fluid pressure applied to the chamber 54, the valve 42, movable member 44b, valve 44a, rod 49 and piston 53 move integrally rightward, the valve 42 comes into contact with the valve seat 37 first and the introduction of working fluid pressure supply from the accumulator 29 stops, then the movable member 44b strikes against the washer 38, the movement of the movable member 44b and valve 44a stops, the working fluid pressure rise stops, and the pressure starts lowering because the valve 44a opens the hole 49a in the rod 49 as a result of the movement of the rod 49. If the rod pushing force by the working fluid pressure of the chamber 56 becomes lower than the pushing force of the piston 53 and spring 52 again as a result of the decrease in this working fluid pressure, an action occurs to close the hole 49a by the valve 44a and lifts the valve 42 off the valve seat 37. By repeating these actions, the working fluid pressure of the chamber 56 is regulated to the fluid pressure of the chamber 54, that is, to a value proportional to the fluid pressure generated by the brake master cylinder 2 at the first specified ratio (See the B-C line in FIG. 2). If the fluid pressure applied to the chamber 54 is high and the rightward pushing force exceeds the pushing force of the spring 48 but if the righward pushing force of the rod 49 does not exceed the pushing force by the piston 53 and spring 52, the piston 47 slides rightward with respect to the rod 49, strikes against the collar section 49c of the rod 49 to push the rod 49 rightward. Thus, the force of the working fluid pressure of the chamber 56 pushing the rod 49 rightward becomes the resultant force of the force acting upon the rod 49 and the force acting upon the piston 47, and the piston 53, rod 49, valve 44a, movable member 44b, and valve 42 move rightward and leftward depending on the magnitude of this resultant force, force of the springs 43 and 46 and piston 53, and force of springs 48 and 52, and the working fluid pressure of the chamber 56 is regulated to a value proportional to the fluid pressure generated by the brake master cylinder 2 at the second specified ratio (see C-D line in FIG. 2). In such regulator valve operation, the working fluid of the fluid chamber 45 is discharged by the movement of the movable member 44b through orifices 01 and 02 when the piston 53 slides to the rod 49 side by the fluid pressure of the chamber 54 to separate the valve 42 from the valve seat 37 by way of the rod 49, valve 44a and movable member 44b. Thus, damping action occurs to the movement of the movable member 44b with no abrupt movement of the movable member 44b and no excessive lift of the valve 42 off the valve seat 37, and the supply of excessive fluid pressure from the accumulator side to the chamber 56 is eliminated and no unusual offensive sound is produced.

The working fluid pressure of the chamber 56 is applied from the groove 38a provided in the washer 38 to the circuit 34 by way of the annular groove 35f of the body 35 and the hole 35c.

When no fluid pressure is applied to the chamber 54, the piston 53 is held by the spring 52 in the position shown in the drawing where its right end is in contact with the inside of the closing member 40 and a clearance 55 exists between the bottom surface of the hole 53a and the right end surface of the rod 49. In this condition, the valve operating mentioned above is carried out only by the spring 52 and the working fluid pressure of the chamber 56 is controlled at the specified fluid pressure (10-odd kg/cm$^2$) (See A-B line in FIG. 2).

A relief valve 66 is incorporated in the valve seat 37 of the regulator valve 33 to prevent the working fluid pressure from the accumulator 29 from exceeding the critical value of the aforementioned specified range and rising further. This relief valve 66 comprises a hole 37c made in the valve seat 37 from the washer 38 side, small passage 37d that causes the center of the bottom of this hole 37c to communicate with the chamber between the filter/spring retainer 41 and the valve seat 37, the valve 68 supported by the retainer 67 which is slidably fitted into the hole 37c, spring 69 which biases the retainer 67 and valve 68 toward bottom surface of the hole 37c, and a plate 70 with a throughhole 70a fitted into the opening of the hole 37. The throughhole 70a in the plate 70 communicates with the groove 38b formed in the washer 38 and this groove 38b communicates with the throughhole 38c.

In this relief valve 66, the valve 68 closes the small passage 37d by the force of the spring 69 against the working fluid pressure from the accumulator when the working fluid pressure from the accumulator 29 is within the aforementioned specified range and the valve 68 is displaced by the working fluid pressure from the accumulator 29 against the spring 69 and opens the small passage 37d when it is about to rise in excess of the higher limit of the aforementioned specified range, and stops the rise of the working fluid pressure on the accumulator side by allowing the working fluid pressure on the accumulator side to escape to the chamber 56.

The working fluid pressure applied from the regulator valve 33 to the circuit 34 is applied from the hole 4e in the body 4 to the working fluid pressure chamber 20 on the left side of the pressure reducing piston 9 by way of a normally open solenoid valve 57. The solenoid valve 57 constitutes the aforementioned second valve together with the normally closed solenoid valve 59 which is provided in the circuit 58 that connects the circuit 34 between the solenoid valve 57 and the working fluid pressure chamber 20 and the drain circuit 36. That is, these solenoid valves 57 and 59 are connected to the electronic control 31 and the electronic control 31 normally does not operate both solenoid valve 57 and 59 and so supplies the working fluid pressure from the regulator valve 33 to the fluid pressure chamber 20, but when the wheels are about to be locked, as detected by a signal from the rotation sensor 60 of the wheel at the time of braking, the electronic control operates both solenoid valves 57 and 59 to outflow the working fluid pressure in the working fluid pressure chamber 20 to the reservoir 25, eliminates the working fluid pressure from the pressure reducing piston 9, moves the pressure reducing piston 9 leftward by the fluid pressure of the reduced pressure chamber 10, closes the hole 5c with the valve 8 in contact with the valve seat 5 in the initial stage of the forward movement of the pressure reducing piston 9, and then increases the volume of the reduced pressure chamber 10 (constituting the fluid pressure circuit section on the side of the wheel brake cylinder) by the forward movement of the pressure reducing piston 9, and reduces the fluid pressure in the wheel brake cylinder 18, thereby reducing the braking force to the wheels.

When the rotational speed of the wheel has increased and the risk of the wheel being locked is eliminated, the electronic control 31 returns both solenoid valve 57 and 59 in the original position, applies the working fluid pressure from the regulator valve 33 again to the working fluid pressure chamber, moves backward the pressure reducing piston 9 and reduces the volume of the reduced pressure chamber 10 to increase the fluid pressure in the wheel brake cylinder 18, and increases the braking force to the wheels. Since the electronic control 31 does not operate both solenoid valves 57 and 59 if the wheels are not locked by increased braking force to the wheels, the reduced pressure piston 9 moves backward to the stop position and the valve 8 is released from the valve seat 5 again. Incidentally, the solenoid valve 57 is sometimes operated temporarily and the increase in the fluid pressure in the fluid pressure chamber may be stopped by increased rotational speed of the wheel during the backward movement of the pressure reducing piston 9 depending on the construction of the electronic control 31.

Figure 2:
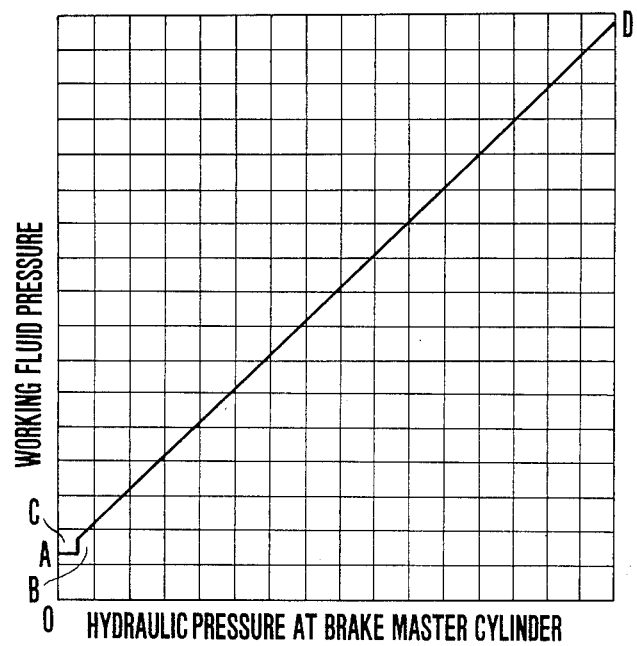
FIG. 2 shows the characteristic curve of the system of FIG. 1.

Since the working fluid pressure indicated with the A-B line in FIG. 2 is applied from the accumulator 29 to the circuit 34 by the operation of the regulator valve 33 when the brake pedal 1 is released during the backward movement of the pressure reducing piston 9 as described above, the pressure reducing piston 9 is always moved back to the stop position by the same working fluid pressure. The working fluid pressure applied by the regulator valve 33 to the circuit 34 is also applied from the circuit 34 to the chamber 22 by way of the hole 4g in the body 4—annular groov 4f—hole 13a in the closing member 13. When the working fluid pressure is not present, for example, when the specified working fluid pressure cannot be obtained because of the failure of the pump 23 or the failure of the accumulator 29, the reduced pressure piston 9 is moved forward by the fluid pressure of the reduced pressure chamber 10 at the time of braking and the valve 8 comes into contact with the valve seat 5 to close the hole 5c because the working fluid pressure is not supplied to the working fluid pressure chamber 20 on the left side of the pressure reducing piston 9, but since the working fluid pressure is not applied to the chamber 22 on the left side of the piston 14 either, the valve 16 is released from the valve seat 7 by the spring 19 to open the hole 7a and is brought into contact with the valve seat 11 to close the hole 11b, so that the fluid pressure applied from the brake master cylinder 2 to the valve chamber 6 is applied to the valve chamber 15 by way of the hole 7a in the valve seat, thereby braking being activated.

Since the reduced pressure chamber 10 and chamber 12 are isolated from the valve chambers 6 and 15 by the operation of the valves 8 and 16 at this time, the fluid from the brake master cylinder 2 will not be wasted by these chambers 10 and 12.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. An anti-skid device for motor vehicles, comprising:
    a hydraulic circuit connecting a brake master cylinder with a wheel brake cylinder;
    a first valve disposed in said hydraulic circuit and dividing said hydraulic circuit into a brake master cylinder side hydraulic circuit and a wheel brake cylinder side hydraulic circuit, said first valve being movable between a first position wherein said master cylinder side hydraulic circuit and said wheel brake cylinder side hydraulic circuit have substantially the same pressure, and a second position wherein said wheel brake cylinder side hydraulic circuit has substantially less pressure than does said master cylinder side hydraulic circuit;
    an electric motor;
    a pump for generating working fluid pressure, wherein said pump is connected to an output of said motor such that said pump is driven by said motor;
    an accumulator communicating with an output of said pump for accumulating working fluid pressure generated by said pump;
    a pressure reducing piston movable between an inactive position in engagement with said first valve for maintaining said first valve in said first position, and an active position out of engagement with said first valve whereby said first valve can assume said second position and the capacity of said wheel brake cylinder side hydraulic circuit is increased, said pressure reducing piston including means for assuming said inactive position in response to the application of the working fluid pressure to a working fluid pressure chamber associated with said pressure reducing piston;
    a working fluid chamber side hydraulic circuit for communicating working fluid with said working fluid pressure chamber;
    a second valve in said working fluid chamber side hydraulic circuit and comprising means for supplying said working fluid pressure to said working fluid pressure chamber when a motor vehicle wheel associated with said wheel brake cylinder side hydraulic circuit is rotating in a normal condition, said second valve also comprising means for releasing said working fluid pressure from said working fluid pressure chamber when locking of the wheel is imminent, whereby said pressure reducing piston can move to said active position so that said first valve can move to said second position in which said wheel brake cylinder side hydraulic circuit has substantially less pressure than does said master cylinder side hydraulic circuit;

a third valve comprising means for controlling the working fluid pressure supplied to said working fluid pressure chamber to a value corresponding to the hydraulic pressure in the brake master cylinder side hydraulic circuit, said third valve including one side valve section comprising means for selectively communicating said accumulator and said working fluid pressure chamber, an other side valve section comprising means for selectively communicating said working fluid pressure chamber and a drain circuit, a piston movable in opposition to the hydraulic pressure in said working fluid pressure chamber to a position for closing said other side valve section and opening said one side valve section, and means responsive to the hydraulic pressure of said brake master cylinder side hydraulic circuit for moving said piston to said position, wherein said one side valve section includes a valve body and a seat member having an internal opening, and wherein said other side valve section includes a valve body slidably and fluid tightly fitted into said internal opening of said seat member of said one side valve section, thereby forming a fluid chamber defined by said seat member, said valve body of said one side valve section and said valve body of said other side valve section, wherein said valve body of said other side valve section includes an orifice, and wherein said fluid chamber is in communication with said working fluid chamber said hydraulic circuit via said orifice.

2. The anti-skid device of claim 11, wherein said second valve comprises a first solenoid valve of a normally open type disposed in a portion of said working fluid chamber side hydraulic circuit between said third valve and said working fluid pressure chamber, and a second solenoid valve of a normally closed type disposed in a portion of said working fluid chamber side hydraulic circuit connecting a drain circuit and a hydraulic circuit between said first solenoid valve and said working fluid pressure chamber.

3. The anti-skid device of claim 1 including a relief valve in said seat member of said one side valve section, said relief valve comprising means for opening when a pressure of working fluid from said accumulator increases beyond a predetermined limit, whereby working fluid from the accumulator is released to the working fluid chamber side hydraulic circuit.

4. The anti-skid device of claim 1 including a rubber seal member between said valve body of said other side valve section and said internal opening of said seat member of said one side valve section for insuring fluid tightness therebetween.

* * * * *